US012547227B2

(12) United States Patent
Nakamura et al.

(10) Patent No.: US 12,547,227 B2
(45) Date of Patent: Feb. 10, 2026

(54) INFORMATION PROCESSING APPARATUS AND CONTROL METHOD

(71) Applicant: Lenovo (Singapore) Pte. Ltd., Singapore (SG)

(72) Inventors: Atsunobu Nakamura, Kanagawa (JP); Hiroki Oda, Kanagawa (JP); Kengo Sano, Kanagawa (JP); Ryohta Nomura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 91 days.

(21) Appl. No.: 18/618,185

(22) Filed: Mar. 27, 2024

(65) Prior Publication Data
US 2024/0393849 A1    Nov. 28, 2024

(30) Foreign Application Priority Data

May 22, 2023    (JP) .................................. 2023-083955

(51) Int. Cl.
*G06F 1/00*    (2006.01)
*G06F 1/26*    (2006.01)
*G06F 1/3203*    (2019.01)

(52) U.S. Cl.
CPC .............. *G06F 1/26* (2013.01); *G06F 1/3203* (2013.01)

(58) Field of Classification Search
CPC ........ G06F 1/26; G06F 1/3203; G06F 1/3206; G06F 1/3293; G06F 9/5027; G06F 1/263; G06F 1/324; G06F 1/329; G06F 9/5038; G06F 9/5094

USPC ......................................................... 713/300
See application file for complete search history.

(56) References Cited

U.S. PATENT DOCUMENTS

| 8,826,092 | B2* | 9/2014 | Berry, Jr. ............... G06F 11/221 |
| | | | 702/182 |
| 12,007,828 | B2* | 6/2024 | Venkataraman ...... G06F 1/3206 |
| 2007/0186213 | A1* | 8/2007 | Abe .................... G06F 11/2041 |
| | | | 718/100 |
| 2007/0208956 | A1* | 9/2007 | Lin .......................... G06F 1/26 |
| | | | 713/300 |
| 2008/0270767 | A1* | 10/2008 | Sonobe ................. G06F 1/3203 |
| | | | 712/E9.021 |

(Continued)

FOREIGN PATENT DOCUMENTS

JP    2018032147 A    3/2018
JP    2023-54498 A    4/2023

*Primary Examiner* — Volvick Derose
(74) *Attorney, Agent, or Firm* — Osha Bergman Watanabe & Burton LLP

(57) ABSTRACT

An information processing apparatus includes a first processor, a second processor, an execution management unit configured to select a processor corresponding to a program whose execution is instructed, based on setting information indicating an execution processor for each program, and a power control unit configured to control an operation state based on power consumption of the first processor and the second processor, according to a power control mode selected from a plurality of levels of power control modes that differ in rated power. The power control unit is configured to stop access to the second processor, when changing the power control mode from a high power control mode whose rated power is higher than or equal to a predetermined rated power to a low power control mode whose rated power is lower than the predetermined rated power.

7 Claims, 7 Drawing Sheets

(56) References Cited

U.S. PATENT DOCUMENTS

| | | | | |
|---|---|---|---|---|
| 2010/0137035 | A1* | 6/2010 | Shan | G06F 1/3265 |
| | | | | 455/566 |
| 2011/0252219 | A1* | 10/2011 | Sonobe | G06F 1/206 |
| | | | | 712/30 |
| 2011/0261062 | A1* | 10/2011 | Kawata | G06F 1/3265 |
| | | | | 345/503 |
| 2012/0030433 | A1* | 2/2012 | Zhang | G06F 15/167 |
| | | | | 711/147 |
| 2017/0277246 | A1* | 9/2017 | Nicholson | G06F 1/329 |
| 2022/0066530 | A1* | 3/2022 | Nakamura | G06F 1/329 |
| 2023/0096035 | A1* | 3/2023 | Chauhan | G09G 5/377 |
| | | | | 345/505 |
| 2024/0370077 | A1* | 11/2024 | Mackey | G06F 1/206 |
| 2025/0181831 | A1* | 6/2025 | Yuasa | G06Q 10/087 |

\* cited by examiner

| POWER CONTROL MODE | | ECO(E) | BALANCE(B) | HIGH PERFORMANCE(P) |
|---|---|---|---|---|
| TARGET TEMPERATURE [°C] | | TMe | TMb | TMp |
| NOISE UPPER LIMIT [dB SPL] | | NLe | NLb | NLp |
| SET POWER [W] | PL1i | PL1ie | PL1ib | PL1ip |
| | PL2i | PL2ie | PL2ib | PL2ip |
| | PL1d | — | — | PL1dp |
| | PL2d | — | — | PL2dp |

FIG. 4

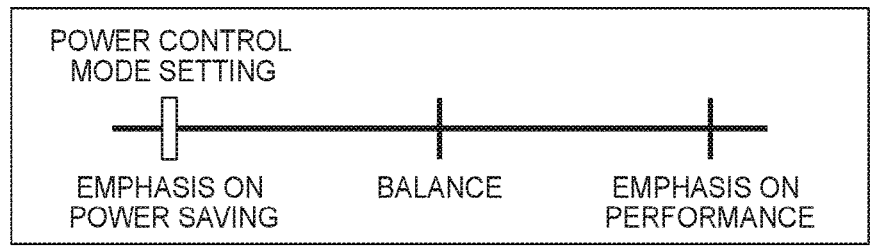

FIG. 5

| MODE TRANSITION PATTERN | POWER CONSUMPTION | DURATION |
|---|---|---|
| BALANCE(B)/ECO(E)→ HIGH PERFORMANCE(P) | P ≥ Pbp | Tbp |
| ECO(E)→BALANCE(B) | P ≥ Peb | Teb |
| HIGH PERFORMANCE(P)/ BALANCE(B)→ECO(E) | P ≤ Pbe | Tbe |
| HIGH PERFORMANCE(P)→ BALANCE(B) | P ≤ Ppb | Tpb |

FIG. 6

| APPLICATION | PROCESSOR |
|---|---|
| APP01 | CPU |
| APP02 | CPU |
| APP03 | GPU |
| APP04 | GPU |

FIG. 7

| APPLICATION | PROCESSOR | USER SETTING |
|---|---|---|
| APP01 | CPU | — |
| APP02 | CPU | — |
| APP03 | GPU | O |
| APP04 | GPU | — |

INFORMATION PROCESSING APPARATUS AND CONTROL METHOD

CROSS-REFERENCE TO RELATED APPLICATIONS

This application claims priority to Japanese Patent Application No. 2023-083955 filed on May 22, 2023, the contents of which are hereby incorporated herein by reference in their entirety.

BACKGROUND

Technical Field

The present application relates to an information processing apparatus and a control method, and relates to, for example, an information processing apparatus including a plurality of types of processors.

Description of the Related Art

Some information processing apparatuses such as personal computers (PCs) include a graphics processing unit (GPU) in addition to a central processing unit (CPU). Providing a GPU enhances graphics functions. The GPU mainly performs image processing (graphics processing), that is, processing for drawing video. In image processing, a large number of routine operations are performed in parallel. Computational resources of the GPU which excel in parallel processing are sometimes used for purposes other than image processing.

For example, an information processing apparatus described in Japanese Unexamined Patent Application Publication No. 2018-32147 includes a CPU and a GPU, and performs image processing on moving image data and performs reproduction processing to display the processed data on a display unit. The CPU and the GPU perform image processing for each frame image that constitutes the moving image data. The processing speed of the GPU is faster than the processing speed of the CPU. The CPU selects part of the frame image as a selection area in response to a user instruction, and the GPU performs image processing on the selection area. The CPU performs image processing on areas other than the selection area.

A GPU may be integrated or built into a CPU. A GPU integrated or built into a CPU is also called an iGPU (integrated GPU) or an IGP (integrated graphics processor). An independent GPU is also called a dGPU (discrete GPU: independent GPU, separate GPU, external GPU). A computer system that includes an iGPU and a dGPU is called switchable graphics (SWG). The SWG is capable of switching between the iGPU and the dGPU in image processing. By switching between the iGPU and the dGPU, the SWG makes it possible to select between enhancement of image processing by the dGPU and reduction of power consumption under low load by the iGPU. A system configuration that includes an iGPU but does not include a dGPU is called a unified memory architecture (UMA). Due to such a difference in system configuration, the SWG is expected to have higher image processing capacity than the UMA as a whole.

A computer system may have a plurality of levels of power control modes that differ in power consumption, and select one level of power control mode depending on the operation status or user operation. Power consumption is controlled using the selected power control mode. However, expected performance in the selected power control mode cannot be achieved in some cases. In the example in FIG. 13, with the SWG, the performance does not change significantly regardless of an increase in power consumption in low power consumption modes whose rated power is lower than predetermined rated power. Moreover, the performance of image processing by the SWG (solid line) is lower than the performance of image processing by the UMA (dashed line). Hence, studies have been made to stop the operation of the dGPU in the case of operating the SWG in a low power consumption mode.

In an operating system (OS), a processor for execution (also referred to herein as "execution processor") may be set for each application program (also referred to herein as "application"). For a specific application that provides a function requiring a large amount of image processing, a dGPU may be designated as an execution processor. Therefore, even in a low power consumption mode, the dGPU may operate when an instruction to start the specific application is issued. In addition, when the power control mode is changed from a high power consumption mode to a low power consumption mode that consumes less power while the specific application is being executed on the dGPU, the processing of the specific application may be continued without stopping the operation of the dGPU. This makes it impossible to achieve expected performance depending on power consumption.

SUMMARY

An information processing apparatus according to one or more embodiments of the present application includes: a first processor; a second processor; an execution management unit configured to select a processor corresponding to a program whose execution is instructed, based on setting information indicating an execution processor for each program; and a power control unit configured to control an operation state based on power consumption of the first processor and the second processor, according to a power control mode selected from a plurality of levels of power control modes that differ in rated power, wherein the power control unit is configured to stop access to the second processor, when changing the power control mode from a high power control mode whose rated power is higher than or equal to a predetermined rated power to a low power control mode whose rated power is lower than the predetermined rated power.

In the information processing apparatus, the power control unit may be configured to, when instructed to change from the high power control mode to the low power control mode during execution of processing of a program using the second processor, output guidance information indicating: at least one of suspending the change to the low power control mode and resuming the processing of the program using the first processor; and ending the processing of the program.

In the information processing apparatus, the power control unit may be configured to, when instructed to suspend the change to the low power control mode, wait without stopping the access to the second processor until the processing of the program using the second processor ends.

In the information processing apparatus, the power control unit may be configured to set setting information indicating the second processor as an execution processor for the program.

In the information processing apparatus, the power control unit may be configured to, when instructed to resume the processing of the program using the first processor, stop the processing of the program using the second processor and thereafter resume the processing of the program using the first processor.

In the information processing apparatus, the power control unit may be configured to set setting information indicating the first processor as an execution processor for the program.

In the information processing apparatus, the first processor may be an integrated graphics processing unit integrated with a central processing unit, and the second processor may be an independent graphics processing unit.

A control method according to one or more embodiments of the present application is a control method for an information processing apparatus including a first processor and a second processor, wherein the information processing apparatus: selects a processor corresponding to a program whose execution is instructed, based on setting information indicating an execution processor for each program; controls an operation state based on power consumption of the first processor and the second processor, according to a power control mode selected from a plurality of levels of power control modes that differ in rated power; and stops access to the second processor, when changing the power control mode from a high power control mode whose rated power is higher than or equal to a predetermined rated power to a low power control mode whose rated power is lower than the predetermined rated power.

One or more embodiments can achieve expected performance in a selected power control mode.

BRIEF DESCRIPTION OF THE DRAWINGS

FIG. 4 is a table illustrating an example of power control modes according to one or more embodiments.

FIG. 5 is a diagram illustrating an example of a power control mode setting screen.

FIG. 6 is a diagram illustrating an example of a power control table according to one or more embodiments.

FIG. 7 is a diagram illustrating an example of graphics setting information according to one or more embodiments.

DETAILED DESCRIPTION

Embodiments of the present application will be described below, with reference to the drawings. First, an overview of an information processing apparatus 1 according to one or more embodiments will be described. In the following description, an example in which the information processing apparatus 1 is a PC is mainly used. However, the information processing apparatus 1 is not limited to a PC, and may be a tablet terminal device, a smartphone, or the like.

Figure 1:
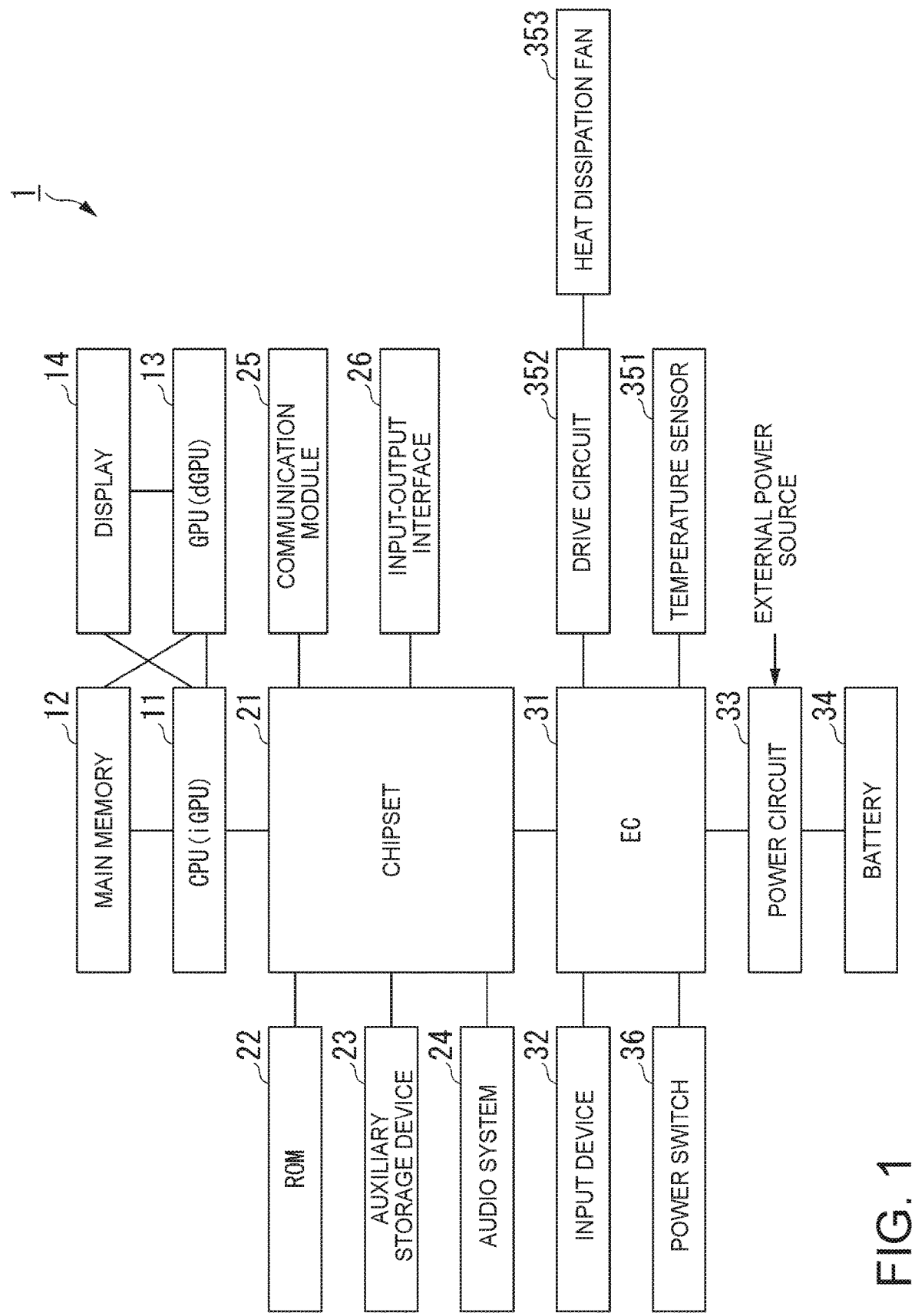
FIG. 1 is a schematic block diagram illustrating an example of the hardware structure of an information processing apparatus according to one or more embodiments.

FIG. 1 is a schematic block diagram illustrating an example of the hardware structure of the information processing apparatus 1 according to one or more embodiments. The information processing apparatus 1 is configured as SWG. The information processing apparatus 1 includes a CPU 11, a main memory 12, a GPU 13, a display 14, a chipset 21, a ROM 22, an auxiliary storage device 23, an audio system 24, a communication module 25, an input-output interface 26, an EC 31, an input device 32, a power circuit 33, a temperature sensor 351, a drive circuit 352, a heat dissipation fan 353, and a power switch 36.

The CPU 11 is a core processing unit in the information processing apparatus 1. The CPU 11 controls the overall operation of the information processing apparatus 1. The CPU 11 executes processing based on programs such as an operating system (OS), firmware, device drivers, utilities, and application programs (also referred to herein as "applications"), for example. Executing processing indicated by a command written in each program is also referred to as "executing the program", "execution of the program", etc.

The CPU 11 includes a GPU in the same core as the main body. That is, the GPU included in the CPU 11 functions as an iGPU. The GPU processes drawing instructions notified from the main body of the CPU 11, in order to achieve functions related to image display (also referred to herein as "image processing"). The GPU outputs obtained drawing information to the display 14 as display data indicating display information.

The main memory 12 is writable memory used as a read area for the execution programs of the CPU 11 and the GPU 13 or a work area for writing processing data of the execution programs. The main memory 12 is, for example, composed of a plurality of dynamic random access memory (DRAM) chips.

The GPU 13 is provided in a core separate from the CPU 11 and functions as a dGPU. The GPU 13 processes drawing instructions notified from the CPU 11 and outputs obtained drawing information to the display 14 as display data indicating display information, in order to achieve functions related to image display. For a predetermined program, such as an application, in a specific power control mode, one of the GPU (iGPU) included in the CPU 11 and the GPU 13 (dGPU) may be predetermined as an execution processor for image processing, as described later. Graphics setting information indicating such execution processors is set in advance as part of setting information related to the execution of the OS. The graphics setting information may be set and generated in response to a user operation (i.e. user-defined).

The CPU 11, the main memory 12, and the GPU 13 correspond to the minimum hardware that constitutes a host system 100 (described later).

For an application for which graphics setting information is set, the CPU 11 issues a drawing instruction to a processor indicated by the graphics setting information, to cause the processor to execute image processing based on the drawing instruction. The image processing function of the GPU 13 is typically faster than the image processing function of the CPU 11.

The iGPU included in the CPU 11 and the GPU 13 (dGPU) may execute parallel computational processing other than image processing, or may share some parallel processing with the main body of the CPU 11. Although image processing is mainly described herein, one or more embodiments are also applicable to such parallel processing instead of or in addition to image processing.

The display 14 displays a display screen based on display data input from the iGPU included in the CPU 11 or the GPU 13 (dGPU). The display 14 may be, for example, a liquid crystal display (LCD), an organic light emitting diode (OLED) display, or the like.

The chipset 21 includes a plurality of controllers, and is connectable to a plurality of devices so as to be able to input and output various data. The controller is any one of bus controllers such as Universal Serial Bus (USB), Serial ATA (AT Attachment), SPI (Serial Peripheral Interface) bus, PCI (Peripheral Component Interconnect) bus, PCI-Express bus, and LPC (Low Pin Count), or a combination thereof. Examples of the plurality of devices include the below-described ROM 22, auxiliary storage device 23, audio system 24, communication module 25, input-output interface 26, and EC 31.

The ROM (read only memory) 22 mainly stores system firmware, firmware for controlling the operations of the EC 31 and other devices, and the like. The ROM 22 may be, for example, an EEPROM (electrically erasable programmable read only memory) or a flash ROM.

The auxiliary storage device 23 stores various data used for processing by the CPU 11, the GPU 13, and other devices, various data acquired by such processing, various programs, etc. The auxiliary storage device 23 may be, for example, one or a combination of a solid state drive (SSD), a hard disk drive (HDD), and the like.

The audio system 24 is connected to a microphone and a speaker (not illustrated), and records, reproduces, and outputs audio data. The microphone and the speaker may be included in the information processing apparatus 1 or provided separately from the information processing apparatus 1.

The communication module 25 connects to a communication network wirelessly or by wire. The communication module 25 communicates various data with other devices connected to the communication network. The communication module includes, for example, a wireless local area network (LAN), and enables transmission and reception of various data between devices according to a predetermined wireless communication method (for example, IEEE 802.11). In the wireless LAN, communication between devices is performed via access points.

The input-output interface 26 connects to various devices such as peripherals by wire or wirelessly. The input-output interface 26 is, for example, a connector for inputting and outputting data by wire in accordance with USB regulations.

The EC (embedded controller) 31 is a one-chip microcomputer that monitors and controls various devices (peripherals, sensors, etc.) regardless of the operation state of the system of the information processing apparatus 1. The EC 31 includes a CPU other than the CPU 11 and the GPU 13, a RAM, a ROM, analog-to-digital (A/D) input terminals of a plurality of channels, digital-to-analog (D/A) output terminals, a timer, and digital input-output terminals (not illustrated). The input-output terminals of the EC 31 are connected to, for example, the input device 32, the power circuit 33, the temperature sensor 351, the drive circuit 352, and the power switch 36.

The input device 32 detects a user operation and outputs an operation signal corresponding to the detected operation to the EC 31. The input device 32 includes, for example, any combination of a keyboard, a touch pad, etc. The input device 32 may be a touch sensor, and may overlap the display 14 to form a touch panel.

The power circuit 33 converts the voltage of DC power supplied from an external power source or the battery 34 into the voltage required for the operation of each device included in the information processing apparatus 1, and supplies the power having the converted voltage to the device. The power circuit 33 supplies power under the control of the EC 31. The power circuit 33 includes a converter that converts the voltage of the power supplied thereto, and a power feeder that charges the battery 34 with the power of the converted voltage. The power feeder charges the battery 34 with the power supplied from the external power source and left unconsumed in each device. In the case where power is not supplied from the external power source or in the case where power supplied from the external power source is insufficient, the power feeder supplies power discharged from the battery 34 to each device as operating power.

The battery 34 charges or discharges power using the power circuit 33. The battery 34 may be, for example, a lithium ion battery, a sodium ion battery, or the like.

The temperature sensor 351, the drive circuit 352, and the heat dissipation fan 353 constitute a heat dissipation unit that dissipates heat generated in the apparatus.

The temperature sensor 351 detects its own temperature and outputs a temperature signal indicating the detected temperature to the EC 31. For example, the temperature sensor 351 is located adjacent to the CPU 11 to detect the temperature of the CPU 11. The number of temperature sensors 351 included in the information processing apparatus 1 is not limited to one, and may be two or more. A temperature sensor other than the temperature sensor 351 adjacent to the CPU 11 may be located adjacent to the GPU 13. The temperatures detected by the respective temperature sensors adjacent to the CPU 11 and the GPU 13 may be used to operate the CPU 11 and the GPU 13 and to drive the heat dissipation fan 353.

The drive circuit 352 supplies the heat dissipation fan 353 with the power supplied to the drive circuit 352 from the power circuit 33, under the control of the EC 31. The operation of the heat dissipation fan 353 is thus controlled. The heat dissipation fan 353 dissipates heat generated in the information processing apparatus 1. The heat dissipation fan 353 includes a motor that consumes power supplied from the drive circuit 352 to rotate fins (blades), and causes air to flow into the chassis of the information processing apparatus 1. The air that has flowed into the chassis exchanges heat with each part of the information processing apparatus 1, and then is discharged from the chassis.

The power switch 36 controls the state of power supply to the entire information processing apparatus 1 to power-on or power-off, each time a press operation is received. When a press operation is received, the power switch 36 outputs a press signal indicating the press to the EC 31. Upon receiving the press signal from the power switch 36 while the information processing apparatus 1 is in a power-off state, the EC 31 causes the power circuit 33 to start supplying power to each device in the information processing apparatus 1 (power-on).

The CPU 11, upon detecting the start of power supply to the CPU 11, reads the system firmware from the ROM 22, loads the system firmware into the main memory 12, and executes a start process (booting) according to commands written in the system firmware. In the start process, the CPU 11 loads the data saved in the auxiliary storage device 23 into the main memory 12. The CPU 11 then starts the OS. After the start of the OS is completed, the CPU 11 starts executing a device driver related to controlling devices such as the auxiliary storage device 23, the communication module 25, and the input-output interface 26.

When power is supplied to the information processing apparatus 1 and a press signal is input from the power switch 36, on the other hand, the EC 31 causes the CPU 11 to execute a stop process (shutdown). In the stop process, the CPU 11 saves the data existing in the work area at the time to the auxiliary storage device 23. After finishing saving the data, the CPU 11 stops processes by applications, device drivers, and other programs that are being executed at the time. The CPU 11 then notifies the EC 31 of the completion of the stop process. The EC 31 causes the power circuit 33 to stop supplying power to each device in the information processing apparatus 1.

The CPU 11 may control the operation of the GPU 13 depending on the power control mode or the operation state of the CPU 11. For example, the CPU 11 can reduce the power consumption of the entire information processing apparatus 1 by stopping the operation of the GPU 13. In the case of a power control mode whose rated power is lower than a predetermined rated power or in the case where the image processing load is less than a predetermined load amount, the operation of the dGPU 13 is stopped while the operation of the iGPU in the CPU 11 is maintained. In the case of a power control mode whose rated power is not lower than the predetermined rated power or in the case where the image processing load is not less than the predetermined load amount, the CPU 11 starts the GPU 13 and causes the GPU 13 to execute image processing. In this case, the image processing function of the IGPU in the CPU 11 may be stopped.

While the CPU 11 and the GPU 13 are each supplied with power of a constant voltage from the power circuit 33, the power consumption is typically variable. The operation frequency of each of the CPU 11 and the GPU 13 may vary depending on the power consumption. For example, the CPU 11 sets the maximum operation frequency allowable depending on the power control mode of the host system 100, in the register of each of the CPU 11 and the GPU 13. When the operation frequency at the time is higher than the set maximum operation frequency, each of the CPU 11 and the GPU 13 changes the operation frequency in stages so as to be not higher than the set maximum operation frequency. The decrease of the operation frequency can reduce the power consumption of each of the CPU 11 and GPU 13. The CPU 11 and the GPU 13 each control the operation frequency so that the moving average value of the power consumption is less than or equal to the rated power.

The CPU 11 and the GPU 13 may each include a thermal control circuit (TCC). For example, the TCC in each of the CPU 11 and the GPU 13 monitors the temperature of the processing unit detected by a temperature sensor. When the detected temperature increases above a predetermined reference temperature due to an increase in load, the TCC may decrease the operation frequency to reduce the power consumption of the corresponding processing unit. This reduces the amount of heat generated and reduces or stops the temperature increase. In other words, in the case where the power consumption is large, the amount of heat generated increases, so that the need for increasing the operation or amount of operation of the heat dissipation fan 353 increases.

Figure 2:
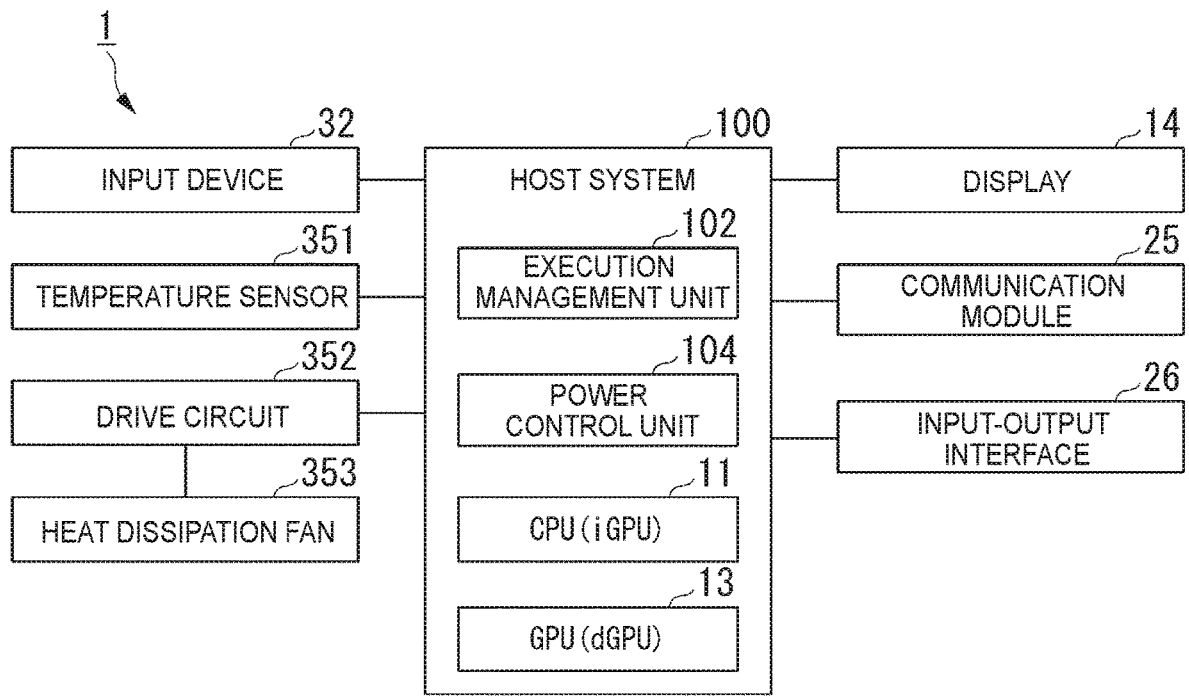
FIG. 2 is a schematic block diagram illustrating an example of the functional structure of the information processing apparatus according to one or more embodiments.

Next, an example of the functional structure of the information processing apparatus 1 according to one or more embodiments will be described. FIG. 2 is a schematic block diagram illustrating an example of the functional structure of the information processing apparatus 1 according to one or more embodiments. The information processing apparatus 1 includes the host system 100.

The functions of the host system 100 are achieved by the CPU 11 executing various programs and cooperating with hardware such as the main memory 12, the GPU 13, the display 14, the chipset 21, the communication module 25, the input-output interface 26, the EC 31, the input device 32, the temperature sensor 351, and the drive circuit 352.

The host system 100 includes an execution management unit 102 and a power control unit 104.

The execution management unit 102 references graphics setting information, and identifies a processor to be used for image processing indicated by an application whose execution is instructed. Graphics setting information indicates one of the CPU 11 (iGPU) and the GPU 13 (dGPU) as a processor for executing image processing for a specific application. The execution management unit 102 may identify an unexecuted application indicated by an operation signal input from the input device 32 or the input-output interface 26 as an application whose execution is newly instructed. The execution management unit 102 causes the CPU 11 to start executing the identified application. For a drawing instruction written directly or indirectly in the application, the CPU 11 notifies the identified processor of the drawing instruction, and causes the processor to execute image processing indicated by the drawing instruction. Examples of the case where a drawing instruction is written indirectly in the application include a call from another instruction.

The power control unit 104 selects one power control mode from a predetermined plurality of levels of power control modes based on the power consumption change tendencies of the CPU 11 and the GPU 13. The power control unit 104 may select a power control mode indicated by an operation signal input from the input device 32 or the input-output interface. The power control unit 104 controls the operation state based on the power consumption of the CPU 11 and the GPU 13, according to the selected power control mode. The plurality of levels of power control modes are each associated with whether the GPU 13 is accessed and the rated power of each of the CPU 11 and the GPU 13. Whether the GPU 13 is accessed means whether the GPU 13 is used in processing such as image processing.

When changing the power control mode from a high power control mode to a low power control mode, the power control unit 104 stops access to the GPU 13 and continues access to the CPU 11. The high power control mode is a power control mode whose rated power is higher than or equal to predetermined rated power. The low power control mode is a power control mode whose rated power is lower than the predetermined rated power. Hence, the GPU 13 is used for image processing in the high power control mode, whereas the CPU 11 is used for image processing in the low power control mode.

However, there is a possibility that, while an application is being executed on the GPU 13, the power control unit 104 is instructed to change the power control mode from the high power control mode to the low power control mode. In such a case, the power control unit 104 outputs display data including guidance information regarding the processing of the GPU 13 to the display 14. The guidance information includes information indicating: at least one of suspending the change of the power control mode to the low power control mode and resuming the execution of the application using the CPU 11; and immediately ending the application using the GPU 13. Suspending the change of the power control mode to the low power control mode means to continue the use of the GPU 13 until the execution of the application ends and, after the execution of the application ends, change the power control mode to the low power control mode. Resuming the execution of the application using the CPU 11 means to end the execution of the application using the GPU 13 and then start executing the application using the CPU 11.

During the execution of the application using the GPU 13, the power control unit 104 waits for an operation signal input from the input device 32 or the input-output interface 26.

The power control unit 104 determines whether an operation signal instructing to suspend the change to the low power control mode, resume the execution of the application using the CPU 11, or immediately end the application using the GPU 13 is input.

When instructed to suspend the change to the low power control mode, the power control unit 104 waits without stopping access to the GPU 13 until the execution of the application by the GPU 13 ends. After the execution of the application ends, the power control unit 104 changes the power control mode to the low power control mode. Here, the power control unit 104 may generate graphic setting information indicating the GPU 13 as the execution processor for the application, and set and store the graphic setting information therein. Subsequently, when executing the application, the power control unit 104 references the set graphic setting information of the application and identifies the GPU 13 as the execution processor. The power control unit 104 causes the identified GPU 13 to execute the application. Here, the power control unit 104 may set the power control mode to the high power control mode.

When instructed to resume the execution of the application using the CPU 11, the power control unit 104 stops the execution of the application by the GPU 13. The power control unit 104 then changes the power control mode to the low power control mode, and starts executing the application using the CPU 11. Here, the power control unit 104 may generate graphic setting information indicating the CPU 11 as the execution processor for the application, and set and store the graphic setting information therein. When executing the application again after the execution of the application ends, the power control unit 104 references the set graphic setting information of the application and identifies the CPU 11 as the execution processor. The power control unit 104 causes the identified CPU 11 to execute the application. In this case, the power control unit 104 may set the power control mode to the low power control mode.

Figure 3:
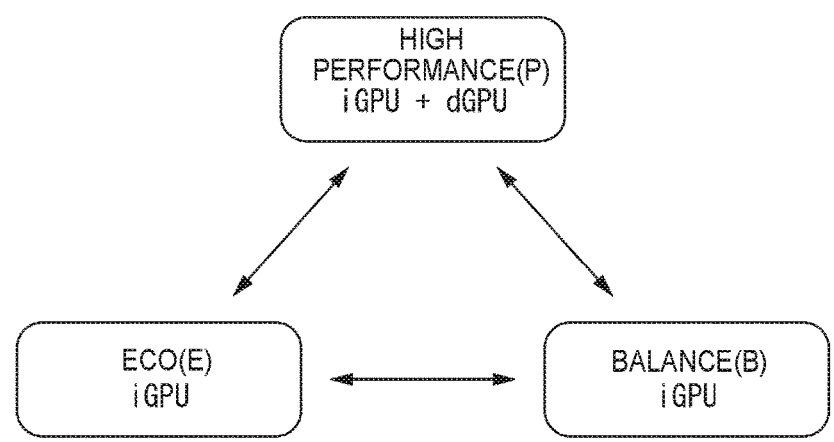
FIG. 3 is a diagram illustrating an example of an execution processor for each power control mode according to one or more embodiments.

Next, an example of power control modes according to one or more embodiments will be described. FIG. 3 is a diagram illustrating an example of an execution processor for each power control mode according to one or more embodiments. Three levels of power control modes are set in the example in FIG. 3. The three levels of power control modes are: eco mode (E: Eco), balance mode (B: Balance), and high performance mode (P: Performance). Eco mode (E) is a power control mode that emphasizes power saving. A power consumption parameter for eco mode (E) is set to be lower than those for the other power control modes. Balance mode (B) is a power control mode that emphasizes the balance between power saving and performance. A power consumption parameter for balance mode (B) is set to be between the respective power consumption parameters for eco mode (E) and high performance mode (P). High performance mode (P) is a power control mode that emphasizes performance. A power consumption parameter for high performance mode (P) is set to be higher than those for the other power control modes. The power consumption parameter includes the rated power of the processor, as described later.

Examples of the low power control mode include eco mode (E) and balance mode (B). In the low power control mode, the CPU 11 operates and the GPU 13 does not operate. Examples of the high power control mode include high-performance mode (P). In the high power control mode, the CPU 11 and the GPU 13 operate. Thus, in the low power control mode, image processing is performed not by the GPU 13 but by the iGPU in the CPU 11, which avoids the issue of not being able to increase power consumption to increase processing capacity in the low power control mode.

FIG. 4 is a table illustrating an example of power control modes according to one or more embodiments. Each power control mode is mainly characterized by set power. The set power is a parameter of power consumption for a processor. In the example in FIG. 4, noise upper limit and target temperature are included. As the set power, a first power limit (Power Limit 1: PL1) and a second power limit (Power Limit 2: PL2) are set for each of the CPU 11 and the GPU 13. PL1 corresponds to rated power. PL1 is a threshold that is allowed to be temporarily exceeded by the moving average value of power consumption but cannot be exceeded by the moving average value of power consumption continuously for at least a predetermined period of time. PL1 is also referred to as "long term power limit". PL2 is a threshold that cannot be exceeded by the moving average value of power consumption. PL2 is also referred to as "short term power limit". The set power for each power control mode of each of the CPU 11 and the GPU 13 may be set in advance in its register. The CPU 11 and the GPU 13 each have a control mechanism that adjusts the clock frequency so that the instantaneous value of power consumption will not exceed PL2 and the moving average of power consumption will not exceed PL1.

In FIG. 4, the subscript "i" denotes the CPU 11 (iGPU), and "d" denotes the GPU 13 (dGPU). The subscript "e" denotes eco mode, "b" denotes balance mode, and "p" denotes high performance mode. Here, PL1ie<PL1ib<PL1ip. Moreover, PL1ie<PL2ie, PL1ib<PL3ib, PL2ip<PL2ip, and PL2ie<PL2ib<PL2ip. Since the GPU 13 is not used in eco mode (E) and balance mode (B), PL1 and PL2 for the GPU 13 are not set in these modes.

The target temperature is the target value of the temperature of the CPU 11 or the GPU 13 for each power control mode. Here, TMe≤TMb≤TMp. The noise upper limit is the maximum noise level caused by the operation of the heat dissipation fan 353. Typically, the noise level is higher when the amount of operation of the heat dissipation fan 353 is larger. Here, NLe<NLb<NLp. The target temperature and the noise upper limit illustrated in FIG. 4 are mainly intended to indicate the characteristics of each power control mode, and do not necessarily need to be used to control the heat dissipation fan 353. A parameter of the amount of operation of the heat dissipation fan 353, such as rotation speed or power consumption, may be used instead of or together with the noise upper limit.

For the purpose of controlling the operation of the heat dissipation fan 353, for example, a temperature control table is stored in the EC 31 in advance. The temperature control table includes at least one set of the operation amount and operation temperature of the heat dissipation fan 353 for each power control mode. The operation temperature is such a temperature that, when the temperature detected by the temperature sensor 351 tends to increase, the heat dissipation fan 353 is instructed to operate with the operation amount corresponding to the operation temperature. The maximum operation amount for each power control mode may correspond to the foregoing noise upper limit, and the operation temperature may correspond to the foregoing target temperature.

Next, a method by which the EC 31 controls the operation of the heat dissipation fan 353 using the temperature control table will be described. In the current power control mode, when the detected temperature tends to increase and exceeds an operation temperature of a certain stage, the EC 31 causes the drive circuit 352 to supply power for producing the operation amount corresponding to the operation temperature to the heat dissipation fan 353. When the detected temperature is decreasing and falls below the operation temperature of a certain stage by a predetermined number of degrees, the EC 31 sets the fan operation amount corresponding to the operation temperature at one stage lower than the certain stage. The EC 31 causes the drive circuit 352 to supply power corresponding to the operation amount to the heat dissipation fan 353.

In the case where there is no output corresponding to the operation temperature of the stage that is one stage lower, the EC 31 determines to stop, and causes the drive circuit 352 to stop supplying power to the heat dissipation fan 353. The temperature control table may be common to the temperatures of the CPU 11 and the GPU 13, or may be separate between the CPU 11 and the GPU 13. In the case where different sets of operation amounts and operation temperatures are set in separate temperature control tables, there is a possibility that the EC 31 determines different operation amounts for the temperatures of the CPU 11 and the GPU 13. In this case, the EC 31 may cause the drive circuit 352 to supply power corresponding to the larger one of the different operation amounts to the heat dissipation fan 353.

When a power control mode setting menu preset in the OS is indicated, the power control unit 104 may cause the display 14 to display a power control mode setting screen. FIG. 5 is a diagram illustrating an example of the power control mode setting screen. The power control mode setting screen is a screen for selecting the power control mode of the host system 100 by operation. The power control mode setting screen in FIG. 5 includes a slider. On the slider, items corresponding to eco mode (E), balance mode (B), and high performance mode (P) are arranged from left to right in this order. In FIG. 5, "emphasis on power saving" corresponds to eco mode (E), "balance" corresponds to balance mode (B), and "emphasis on performance" corresponds to high performance mode (P). By moving the indicator to the position of one of the items according to the operation, the power control unit 104 selects the power control mode associated with the item to which the indicator has been moved. In the illustrated example, eco mode (E) is selected.

The power control mode is also changed depending on the operation state of the host system 100. A power control table indicating a transition condition for each mode transition pattern is preset in the power control unit 104. The mode transition pattern indicates a set of power control modes before and after change. The power control unit 104 monitors the operation state of the host system 100, and, with reference to the power control table, identifies a transition condition corresponding to each mode transition pattern whose power control mode before change is the current power control mode.

In the case where the operation state satisfies the transition condition from the current power control mode to another power control mode, the power control unit 104 changes the current power control mode to the other power control mode corresponding to the transition condition. The power control unit 104 notifies the CPU 11 and the GPU 13 of the changed power control mode, and causes them to operate according to the set power corresponding to the changed power control mode. The power control unit 104 notifies the EC 31 of the changed power control mode, and causes the heat dissipation fan 353 to operate with the operation amount and operation temperature corresponding to the changed power control mode.

FIG. 6 is a diagram illustrating an example of the power control table according to one or more embodiments. In the example in FIG. 6, the power consumption P and duration of the host system 100 are indicated for each mode transition pattern. A set of power consumption P and duration represents a transition condition. For example, the transition condition from balance mode (B) or eco mode (E) to high performance mode (P) is that the state in which power consumption P is greater than or equal to Pbp continues for duration Tbp or longer. The transition condition from eco mode (E) to balance mode (B) is that the state in which power consumption P is greater than or equal to Peb continues for duration Teb or longer. The transition condition from high performance mode (P) or balance mode (B) to eco mode (E) is that the state in which power consumption P is less than or equal to Pbe continues for duration Tbe or longer. The transition condition from high performance mode (P) to balance mode (B) is that the state in which power consumption P is less than or equal to Ppb continues for duration Tpb or longer. Pbp, Peb, Pbe, and Ppb are each a predetermined power consumption threshold. Here, Pbp>Peb, Pbp>Pbe, Peb>Pbe, and Pbp>Ppb. Durations Tbp, Teb, Tbe, and Tpb are each set to, for example, several seconds to several minutes.

Next, an example of graphics setting information will be described. The graphics setting information is information indicating a processor used for image processing for each application. FIG. 7 is a diagram illustrating an example of the graphics setting information according to one or more embodiments. In the example in FIG. 7, the CPU 11 (iGPU) is set for APP01 and APP02. Applications that do not involve a large amount of image processing or other parallel processing during execution are designated as APP01 and APP02. Examples of such applications include text document creation applications and presentation document creation applications. The GPU 13 (dGPU) is set for APP03 and APP04. Applications that involve a large amount of image processing or other parallel processing during execution are designated as APP03 and APP04. Examples of such applications include online moving image editing applications, lyrics/video synchronous reproduction applications, and game applications.

Figure 8:
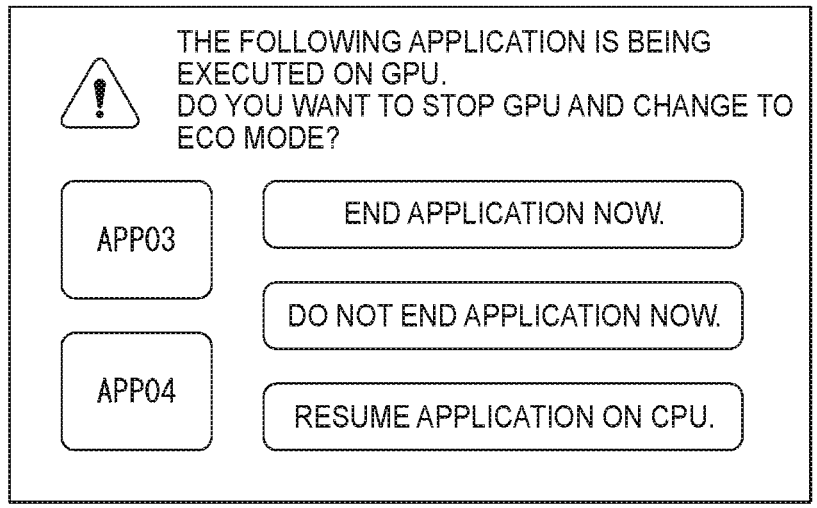
FIG. 8 is a diagram illustrating an example of a message screen according to one or more embodiments.

Next, an example of guidance information will be described. When changing the power control mode from the high power control mode to the low power control mode during the execution of an application for which the GPU 13 is indicated as an execution processor, the power control unit 104 presents guidance information on the display 14. FIG. 8 is a diagram illustrating an example of a message screen according to one or more embodiments. On the message screen, applications being executed on the GPU 13 and respective messages indicating suspending the change of the power control mode to the low power control mode, resuming the execution of the application using the CPU 11, and immediately ending the application are arranged as options included in the guidance information.

On the message screen illustrated in FIG. 8, icons representing APP03 and APP04 as applications being executed on the GPU 13 are arranged. Moreover, a message inquiring about stopping the GPU 13 and changing to eco mode which is the low power control mode and respective buttons representing three options are arranged. As the options, a message "End application now." indicating the immediate end (termination) of the application, a message "Do not end application now." indicating the suspension of the change to the low power control mode, and a message "Resume application on CPU." indicating the resumption of the execution of the application using the CPU 11 are shown. The power control unit 104 can identify a button detected as being pressed, and identify the option corresponding to the identified button. Herein, the term "press" also means acquiring or detecting an operation signal indicating the position of a screen component such as a button or other display information.

Figure 9:
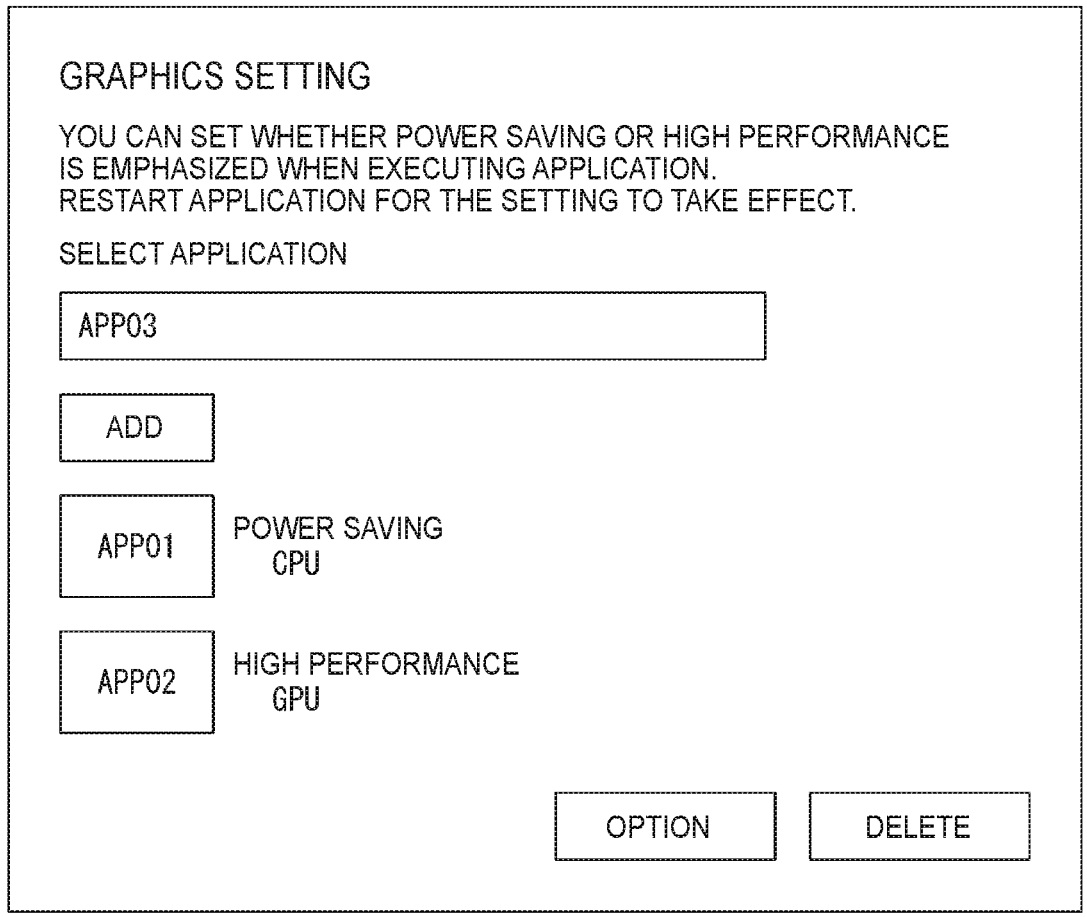
FIG. 9 is a diagram illustrating an example of an application selection screen.

Next, an example of an application selection screen will be described. For example, the power control unit 104 causes the display 14 to display the application selection screen when a system setting menu of the OS is selected. FIG. 9 is a diagram illustrating an example of the application selection screen. The application selection screen illustrated in FIG. 9 is a screen showing an application for which graphics setting information is to be set and a list of applications for which graphics setting information has already been set. In the illustrated example, application APP03 is designated as an application for which graphics setting information is to be set. The "Add" button functions as a button for instructing to display a graphics setting screen for designated APP03. APP01 and APP02 are icons representing applications for which graphics setting information has already been set. These icons each function as a button for, when pressed, instructing the power control unit 104 to display a graphics setting screen related to the application.

Figures 10, 11:
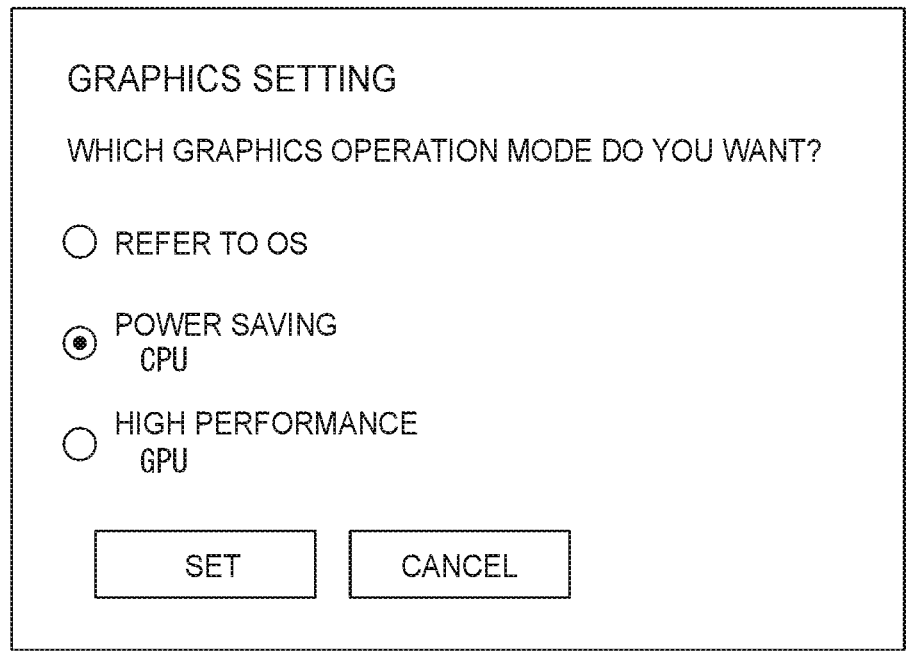
FIG. 10 is a diagram illustrating an example of a graphics setting screen.
FIG. 11 is a diagram illustrating another example of graphics setting information according to one or more embodiments.

Next, an example of a graphics setting screen will be described. FIG. 10 is a diagram illustrating an example of the graphics setting screen. The graphics setting screen illustrated in FIG. 10 is a screen showing information for setting a power control mode and an execution processor as an image processing operation mode for the selected application. In the illustrated example, any one of the three items can be selected. "Refer to OS" indicates using a power control mode and a processor preset in the OS. "Power saving CPU" indicates the low power control mode as the power control mode and the CPU 11 as the execution processor. "High performance GPU" indicates the high power control mode as the power control mode and the GPU as the execution processor. The "Set" button is a button for instructing to generate graphic setting information. The "Cancel" button is a button for instructing to cancel the generation of graphic setting information. The host system 100 erases the display of the graphics setting screen when the "Cancel" button is pressed.

When the power control unit 104 displays the message screen and detects the suspension of the change to the low power control mode for the currently executed application, the power control unit 104 may form a graphics setting screen showing the high power control mode as the power control mode and the GPU as the execution processor and cause the display 14 to display the graphics setting screen. Upon detecting that the "Set" button is pressed, the power control unit 104 generates and stores graphic setting information indicating the GPU 13 as the execution processor for the application.

When the power control unit 104 displays the message screen and detects the resumption of the execution using the CPU 11 for the currently executed application, the power control unit 104 may form a graphics setting screen showing the low power control mode as the power control mode and the CPU as the execution processor and cause the display 14 to display the graphics setting screen. Upon detecting that the "Set" button is pressed, the power control unit 104 generates and stores graphic setting information indicating the CPU 11 as the execution processor for the application.

The power control unit 104 may store, in association with graphics setting information, user setting information indicating that the graphics setting information has been generated in response to an operation such as pressing a button on the message screen or pressing the "Set" button on the graphics setting screen. In graphics setting information illustrated in FIG. 11, user setting information is added to the graphics setting information for APP03. The power control unit 104 stores graphics setting information associated with user setting information, without erasing or changing it until an operation is received again. Depending on the specifications of the OS, the power control unit 104 may erase graphics setting information generated according to the OS when the power control mode is changed from the low power control mode to the high power control mode. Erasing of graphics setting information generated in response to an operation can be avoided by storing the graphics setting information in association with user setting information.

Figure 12:
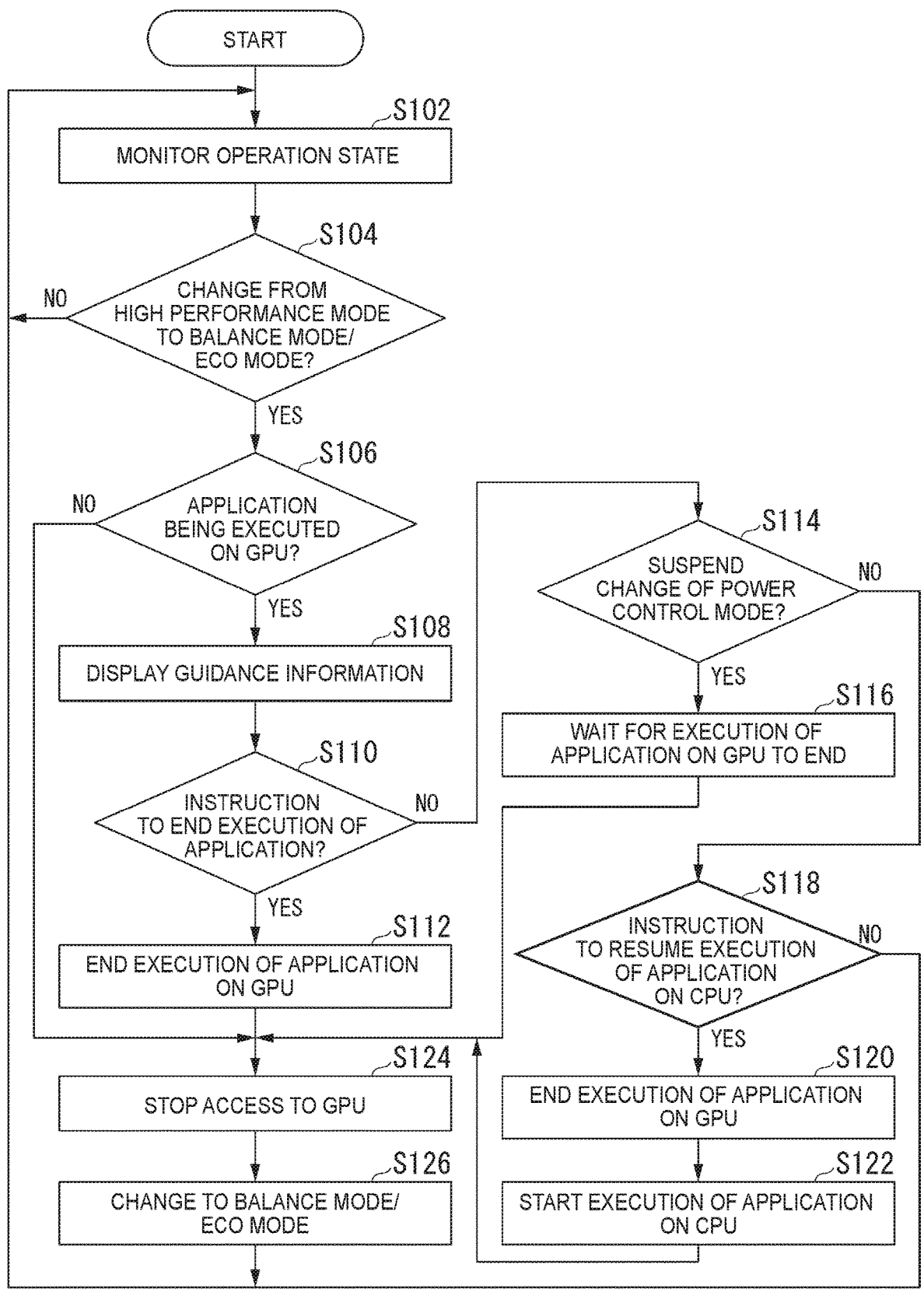
FIG. 12 is a flowchart illustrating an example of application execution control according to one or more embodiments.
Figure 13:
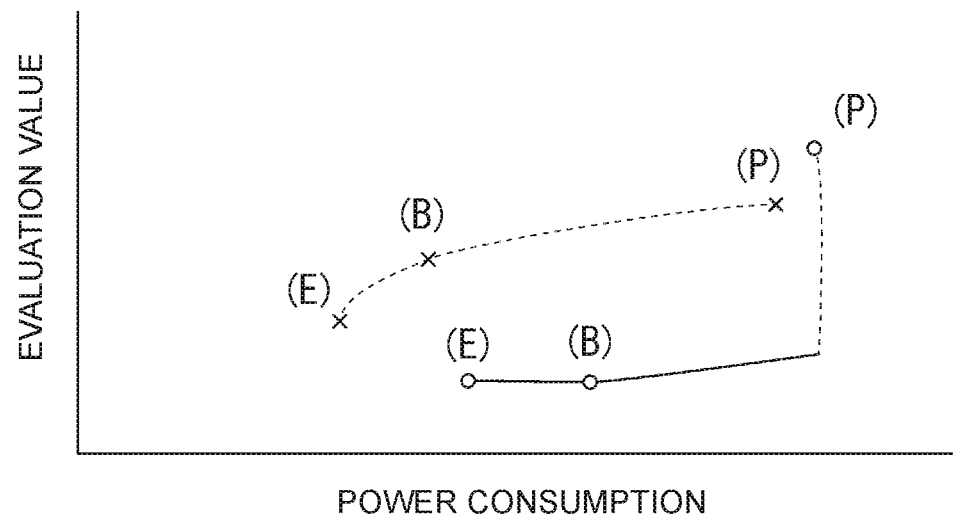
FIG. 13 is a diagram illustrating a comparative example of performance evaluation values of information processing apparatuses.

Next, an example of application execution control according to one or more embodiments will be described. FIG. 12 is a flowchart illustrating an example of application execution control according to one or more embodiments. An example in which the high power control mode is high performance mode (P) and the low power control mode is balance mode (B) or eco mode (E) is used here.

(Step S102) The power control unit 104 monitors the operation state of the host system 100. The power control unit 104 monitors whether an operation signal indicating a power control mode is input. The power control unit 104 also monitors the power consumption of the CPU 11 and the GPU 13 included in the host system 100, and determines whether the power consumption satisfies a transition condition from the current power control mode to another power control mode.

(Step S104) The power control unit 104 determines whether an instruction to change the power control mode from high performance mode to balance mode or eco mode has been issued. In the case where the power control unit 104 determines that the instruction has been issued (step S104: YES), the process advances to step S106. In the case where the power control unit 104 determines that the instruction has not been issued (step S104: NO), the process returns to step S102.

(Step S106) The power control unit 104 determines whether there is an application being executed using the GPU 13. For example, the power control unit 104 outputs an inquiry command for a program being executed to the GPU 13. Having received the inquiry command from the power control unit 104, the GPU 13 outputs response information indicating whether there is a program being executed to the power control unit 104. In the case where there is a program being executed, the response information output by the GPU 13 may include information indicating the name of the program. In the case where the power control unit 104 determines that there is an application being executed (step S106: YES), the process advances to step S108. In the case where the power control unit 104 determines that there is no application being executed (step S106: NO), the process advances to step S124.

(Step S108) The power control unit 104 outputs display data including guidance information regarding the processing of the GPU 13 to the display 14, to cause the display 14 to display a message screen showing the guidance information.

(Step S110) The power control unit 104 determines whether an instruction to immediately end the application using the GPU 13 has been issued through an operation signal input to the power control unit 104. In the case where the power control unit 104 determines that the instruction has been issued (step S110: YES), the process advances to step S112. In the case where the power control unit 104 determines that the instruction has not been issued (step S110: NO), the process advances to step S114.

(Step S112) The power control unit 104 causes the GPU 13 to end the execution of the currently executed application. For example, the power control unit 104 issues an end command for the application to the GPU 13. Upon receiving the end command from the power control unit 104, the GPU 13 stops processing based on the currently executed application. The power control unit 104 outputs a stop notification indicating the stop of processing to the power control unit 104. The process then advances to step S124.

(Step S114) The power control unit 104 determines whether an instruction to suspend the change of the power control mode has been issued through an operation signal input to the power control unit 104. In the case where the power control unit 104 determines that the instruction has been issued (step S114: YES), the process advances to step S116. In the case where the power control unit 104 determines that the instruction has not been issued (step S114: NO), the process advances to step S118.

(Step S116) The power control unit 104 monitors the execution state of the application on the GPU 13 and waits for the execution of the application to end. Once the power control unit 104 has detected the end of the execution of the application, the process advances to step S124.

(Step S118) The power control unit 104 determines whether an instruction to resume the execution of the application using the CPU 11 has been issued through an operation signal input to the power control unit 104. In the case where the power control unit 104 determines that the instruction has been issued (step S118: YES), the process advances to step S120. In the case where the power control unit 104 determines that the instruction has not been issued (step S118: NO), the process returns to step S102.

(Step S120) The power control unit 104 ends the execution of the application on the GPU 13. For example, the power control unit 104 issues an end command for the application to the GPU 13. Upon receiving the end command from the power control unit 104, the GPU 13 stops processing based on the currently executed application. Here, the GPU 13 generates an image file including parameters related to the operation of the application, input data scheduled to be input, and intermediate data and output data generated up to this point. The GPU 13 stores the generated image file in the main memory 12 or the auxiliary storage device 23. After this, the GPU 13 outputs a stop notification indicating the stop of processing to the power control unit 104. The stop notification output by the GPU 13 may include address information indicating the location of the image file. The process then advances to step S124.

(Step S122) The power control unit 104 starts the execution of the application whose execution by the GPU 13 has been ended. For example, the power control unit 104 issues an execution command for the application to the CPU 11. The execution command output by the power control unit 104 may include the address information notified from the GPU 13. The CPU 11 starts executing the application in response to the execution command input from the power control unit 104. Before starting executing the application, the CPU 11 acquires the image file whose location is indicated by the address information notified from the power control unit 104. The CPU 11 starts executing the application using the acquired image file. The process then advances to step S124.

(Step S124) The power control unit 104 stops access to the GPU 13.

(Step S126) The power control unit 104 changes the power control mode of the host system 100 to either balance mode or eco mode determined in step S104. The power control unit 104 notifies the CPU 11 and the EC 31 of the changed power control mode. The process then returns to step S102.

Although the above describes an example in which the CPU 11 and the GPU 13 share one main memory 12, the present invention is not limited to such. The information processing apparatus 1 may include a plurality of main memories. In this case, the CPU 11 and the GPU 13 may use different main memories. Even in the case of stopping the operation of the GPU 13, the power control unit 104 may not stop power supply to the main memory dedicated to the GPU 13 but maintain operation, while the CPU 11 is operating. This can prevent a failure in transferring image files to or from the CPU 11 when the GPU 13 is stopped.

Although the above describes graphics setting information mainly as setting information indicating an execution processor for each program, the present invention is not limited to such. The present invention may be applied to other types of programs than applications, such as application programming interface (API) functions and utility programs. The present invention may be applied to parallel processing other than image processing, such as numerical computations.

As described above, the information processing apparatus 1 according to one or more embodiments includes a first processor (for example, the CPU 11) and a second processor (for example, the GPU 13). The information processing apparatus 1 includes: an execution management unit 102 configured to select a processor corresponding to a program whose execution is instructed, based on setting information (for example, graphics setting information) indicating an execution processor for each program (for example, application); and a power control unit 104 configured to control an operation state based on power consumption of the first processor and the second processor, according to a power control mode selected from a plurality of levels of power control modes that differ in rated power. The power control unit 104 is configured to stop access to the second processor, when changing the power control mode from a high power control mode whose rated power is higher than or equal to a predetermined rated power to a low power control mode whose rated power is lower than the predetermined rated power.

The first processor may be an iGPU integrated with the CPU 11, and the second processor may be a dGPU separate from the CPU 11.

With this structure, when changing from the high power control mode to the low power control mode lower in rated power, access to the second processor is stopped and processing using the second processor is not performed. Therefore, even in the case where an execution processor is set for each program, performance commensurate with an increase in power consumption can be achieved by using the first processor instead of the second processor in the low power control mode.

The power control unit 104 is configured to, when instructed to change from the high power control mode to the low power control mode during execution of processing of a program using the second processor, output guidance information indicating: at least one of suspending the change to the low power control mode and resuming the processing of the program using the first processor; and ending the processing of the program.

According to the output guidance information, during the execution of the processing of the program using the second processor, instead of immediately stopping processing by the second processor, the following options corresponding to stopping the second processor are provided: one of suspending the change to the low power control mode and resuming the processing of the program using the first processor; and ending the processing of the program. The user is therefore given an opportunity to select one of the options in consideration of the execution state of the processing being executed.

The power control unit 104 is configured to, when instructed to suspend the change to the low power control mode, wait without stopping the access to the second processor until the processing of the program using the second processor ends.

With this structure, the second processor operates until the processing being executed by the second processor is completed. Thus, obtaining the result of the processing being executed can be prioritized.

The power control unit 104 may be configured to set setting information indicating the second processor as an execution processor for the program.

By prioritizing the completion of the processing being executed by the second processor, it is presumed that the second processor is intended to be used for executing the program. Using the second processor indicated by the setting information to execute the program can meet the intention of the user.

The power control unit 104 may be configured to, when instructed to resume the processing of the program using the first processor, stop the processing of the program using the second processor and thereafter resume the processing of the program using the first processor.

With this structure, the processing being executed by the second processor is immediately stopped and the processing of the program is resumed using the first processor. Thus, even if the processing of the program is temporarily interrupted, the execution of the program using the first processor can be prioritized.

The power control unit 104 may be configured to set setting information indicating the first processor as an execution processor for the program.

By prioritizing the resumption of the processing by the first processor, it is presumed that the first processor is intended to be used for executing the program. Using the first processor indicated by the setting information to execute the program can meet the intention of the user.

Design matters such as various setting information and parameters related to the foregoing processing are not limited to those illustrated, and may vary depending on various requirements such as the processing ability of the processor. Although the above describes an example in which eco mode (E) and balance mode (B) are each the low power control mode and high performance mode (P) is the high power control mode, the low power control mode and the high power control mode may be classified differently depending on the specifications of each individual processor. For example, eco mode (E) may be the low power control mode and balance mode (B) and high performance mode (P) may each be the high power control mode. The number of levels of power control modes is not limited to three, and may be two or four or more.

PL1 and PL2 for each level of power control mode, power consumption parameters and durations as transition conditions of power control modes, etc. may be different. If the duration is constant regardless of the power control mode, the duration may be omitted in the mode transition table.

When determining whether to continue the state of the host system 100, the power control unit 104 may use, as the power consumption of the CPU 11 and the GPU 13, the moving average value up to the point instead of the instantaneous value. The moving average value may be, for example, an exponentially weighted moving average, or a simple moving average within a predetermined period (for example, several seconds to several minutes) up to the time of interest.

Although the embodiments of the present invention have been described in detail above with reference to the drawings, specific structures according to the present invention are not limited to the foregoing embodiments, and include design and the like within the scope of the present invention. The structures described in the foregoing embodiments may be freely combined.

DESCRIPTION OF SYMBOLS

1 information processing apparatus
11 CPU
12 main memory
13 GPU
21 chipset
22 ROM
23 auxiliary storage device
24 audio system
25 communication module
26 input-output interface
31 EC
32 input device
33 power circuit
34 battery
36 power switch
351 temperature sensor
100 host system
102 execution management unit
104 power control unit
352 drive circuit
353 heat dissipation fan

The invention claimed is:

1. An information processing apparatus comprising:
a first processor;
a second processor;
an execution management unit configured to select a processor corresponding to a program whose execution is instructed, based on setting information indicating an execution processor for each program; and a power control unit configured to:
control an operation state based on power consumption of the first processor and the second processor, according to a power control mode selected from a plurality of levels of power control modes that differ in rated power,
stop access to the second processor, when changing the power control mode from a high power control mode whose rated power is higher than or equal to a predetermined rated power to a low power control mode whose rated power is lower than the predetermined rated power, and
when instructed to change from the high power control mode to the low power control mode during execution of processing of a program using the second processor, output guidance information indicating:
at least one of suspending the change to the low power control mode and resuming the processing of the program using the first processor, and
ending the processing of the program.

2. The information processing apparatus according to claim 1, wherein the power control unit is configured to, when instructed to suspend the change to the low power control mode, wait without stopping the access to the second processor until the processing of the program using the second processor ends.

3. The information processing apparatus according to claim 2, wherein the power control unit is configured to set setting information indicating the second processor as an execution processor for the program.

4. The information processing apparatus according to claim 3, wherein the power control unit is configured to set setting information indicating the first processor as an execution processor for the program.

5. The information processing apparatus according to claim 1, wherein the power control unit is configured to, when instructed to resume the processing of the program using the first processor, stop the processing of the program using the second processor and thereafter resume the processing of the program using the first processor.

6. The information processing apparatus according to claim 1, wherein
the first processor is an integrated graphics processing unit integrated with a central processing unit, and
the second processor is an independent graphics processing unit.

7. A control method for an information processing apparatus including a first processor and a second processor, comprising:
selecting a processor corresponding to a program whose execution is instructed, based on setting information indicating an execution processor for each program;
controlling an operation state based on power consumption of the first processor and the second processor, according to a power control mode selected from a plurality of levels of power control modes that differ in rated power;
stopping access to the second processor, when changing the power control mode from a high power control mode whose rated power is higher than or equal to a predetermined rated power to a low power control mode whose rated power is lower than the predetermined rated power;
when instructed to change from the high power control mode to the low power control mode during execution of processing of a program using the second processor, outputting guidance information indicating:
at least one of suspending the change to the low power control mode and resuming the processing of the program using the first processor, and
ending the processing of the program.

* * * * *